United States Patent [19]

Decelles et al.

[11] Patent Number: 4,790,548

[45] Date of Patent: Dec. 13, 1988

[54] CLIMBING AND DESCENDING VEHICLE

[76] Inventors: Fabien Decelles; Pierre Decelles, both of 2380 St. Alexis Blvd., St. Maurice, Canada, G0X 2X0

[21] Appl. No.: 56,249

[22] Filed: Jun. 1, 1987

[30] Foreign Application Priority Data

May 4, 1987 [CA] Canada .................................. 536338

[51] Int. Cl.[4] ............................................... B62B 9/06
[52] U.S. Cl. ..................................... 280/5.26; 180/6.5; 180/8.2; 280/242 WC; 280/DIG. 10
[58] Field of Search ............... 280/242 WC, DIG. 10, 280/5.2, 5.26; 297/DIG. 4; 180/901, 907, 6.2, 6.48, 6.5, 8.2, 8.3

[56] References Cited

U.S. PATENT DOCUMENTS

| 3,241,848 | 3/1966 | Flory | 280/5.26 |
| 3,283,839 | 11/1966 | Brown et al. | 280/5.26 |
| 3,580,344 | 5/1971 | Floyd | 180/8.2 |
| 4,457,526 | 7/1984 | Persson | 280/5.26 |
| 4,614,246 | 9/1986 | Masse | 180/907 |
| 4,645,222 | 2/1987 | Hester | 180/8.2 |
| 4,709,772 | 12/1987 | Brunet | 180/8.2 |

FOREIGN PATENT DOCUMENTS

| 535077 | 12/1956 | Canada . |
| 877832 | 8/1971 | Canada . |
| 1048075 | 2/1979 | Canada . |
| 2498147 | 7/1982 | France ............................ 280/5.26 |

Primary Examiner—David M. Mitchell
Assistant Examiner—Everett G. Diederiks, Jr.

[57] ABSTRACT

A stair-climbing and descending vehicle is disclosed, comprising a frame and a pair of transverse, co-axial, power-driven axles, each rotatably carrying a spider assembly at its outer end. Each spider has at least three wheels, one at each equi-spaced extremity of its radial arms. Each axle drives either the spider or the associated wheels through a differential gearing. When climbing a stairway, the spiders are rotated immediately when the wheels are prevented from rotating by encountering a stair riser. The differential also serves to safety and smoothly descend the stairs. The vehicle is adapted for use as a wheelchair, in which case a chair-shifting device is provided to shift the center of gravity of the vehicle, rearwardly.

2 Claims, 7 Drawing Sheets

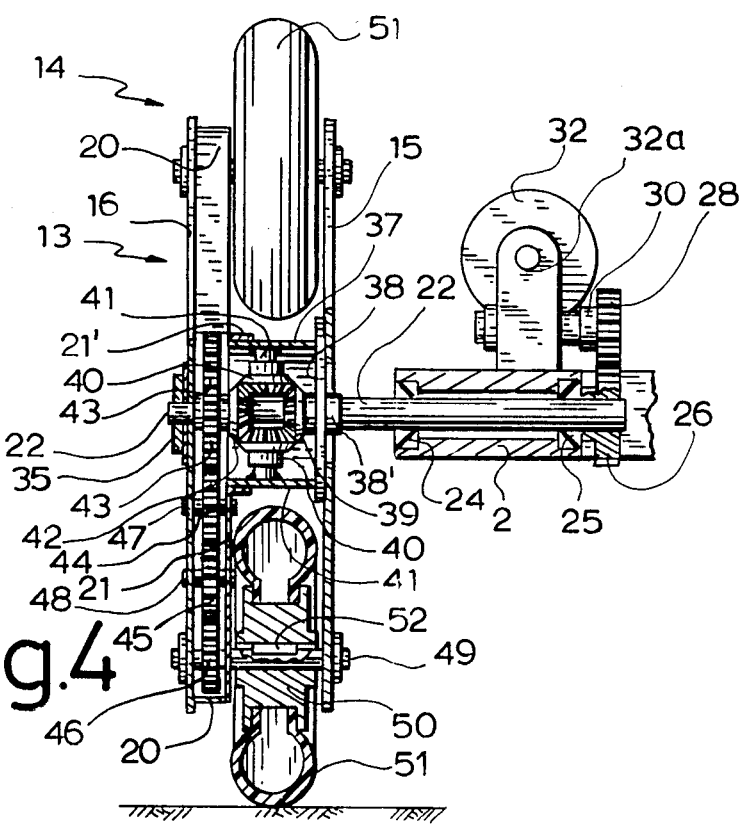
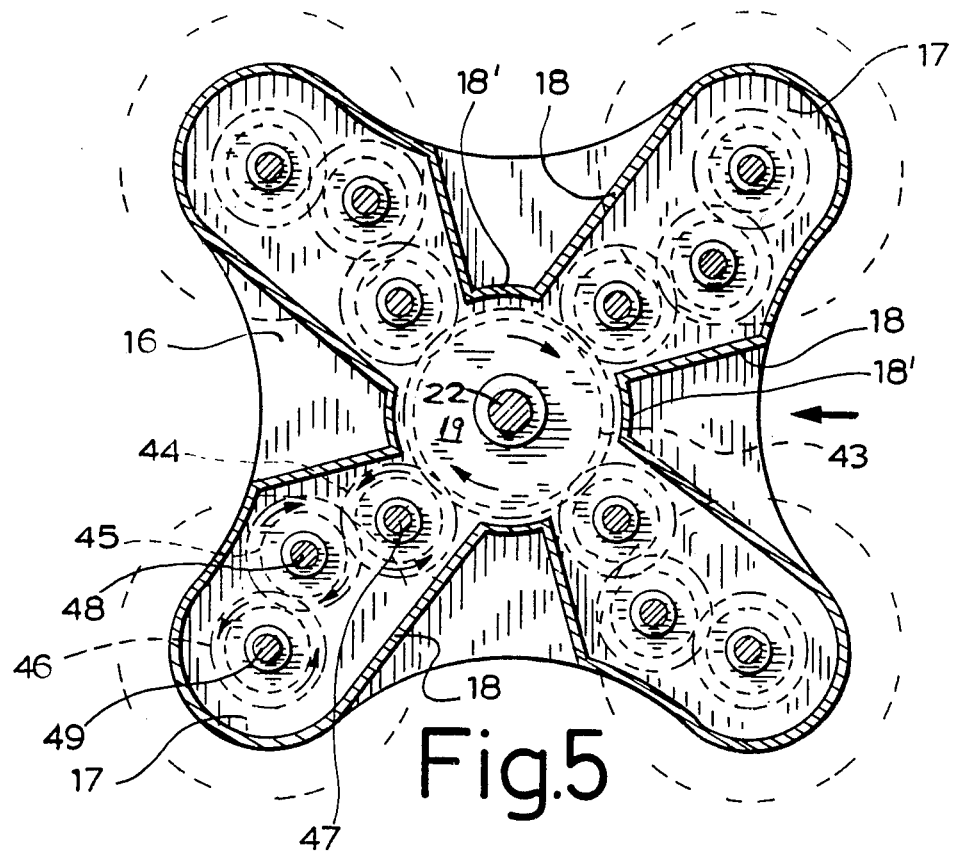

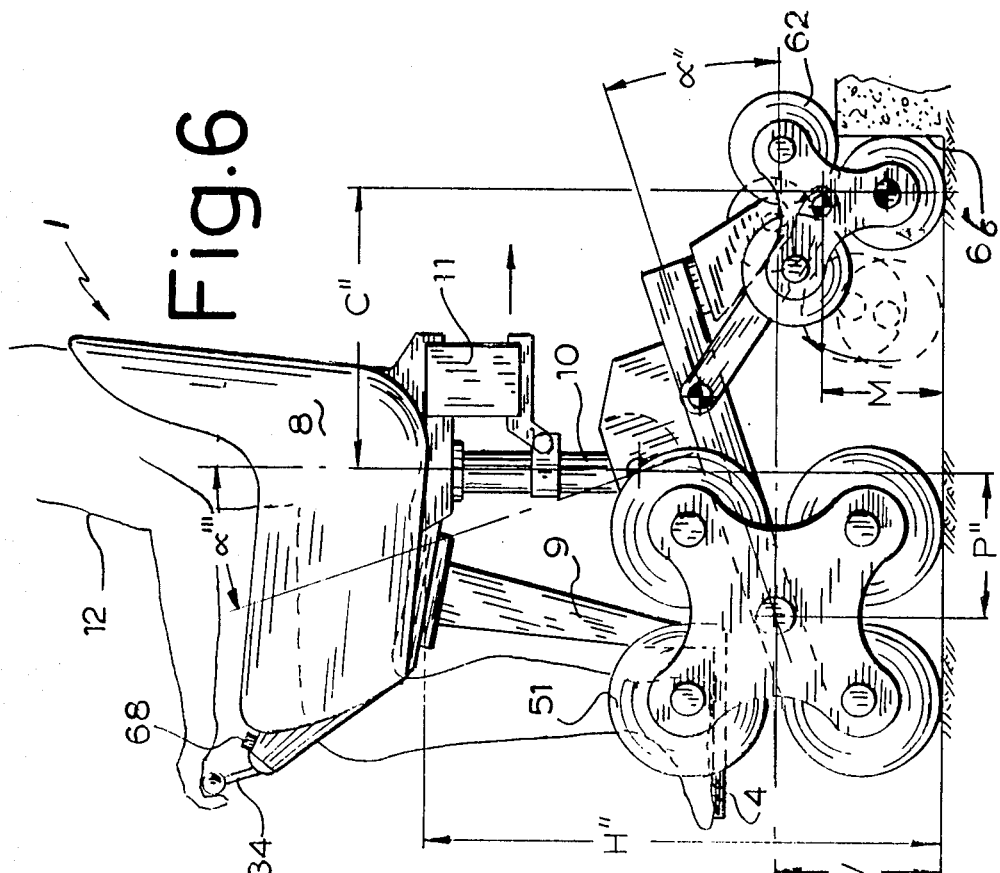
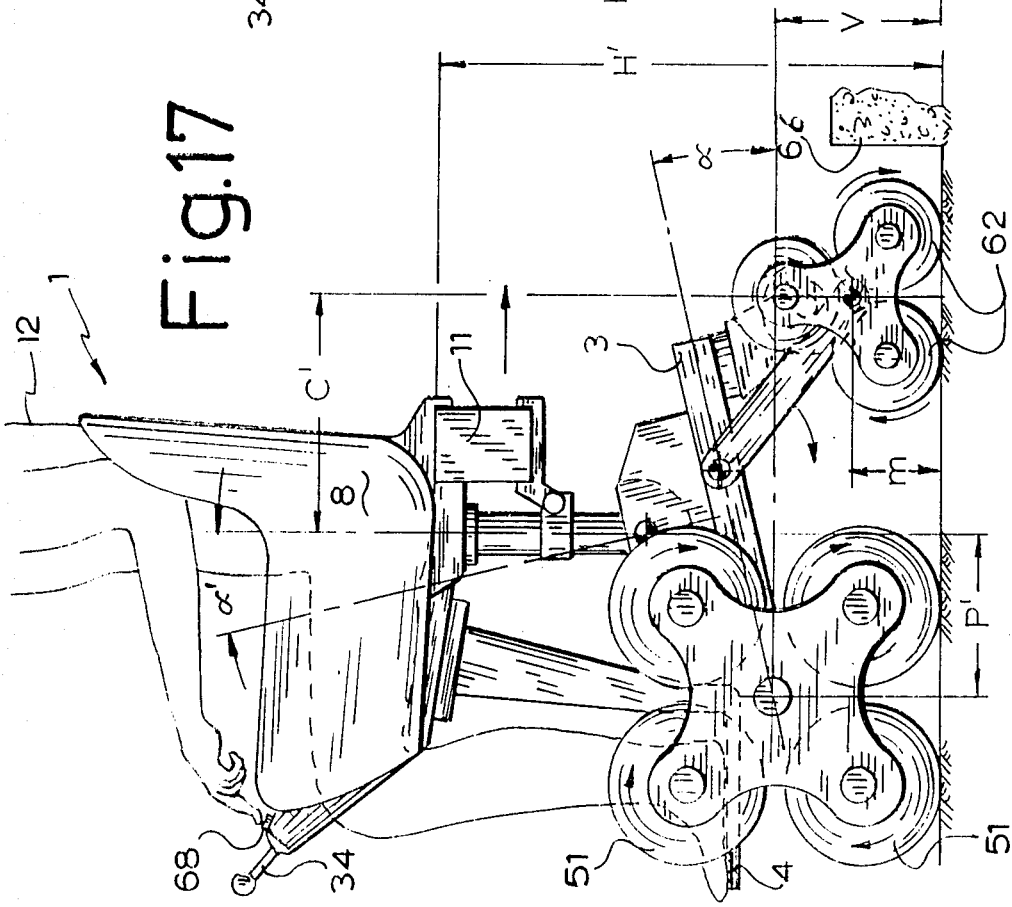

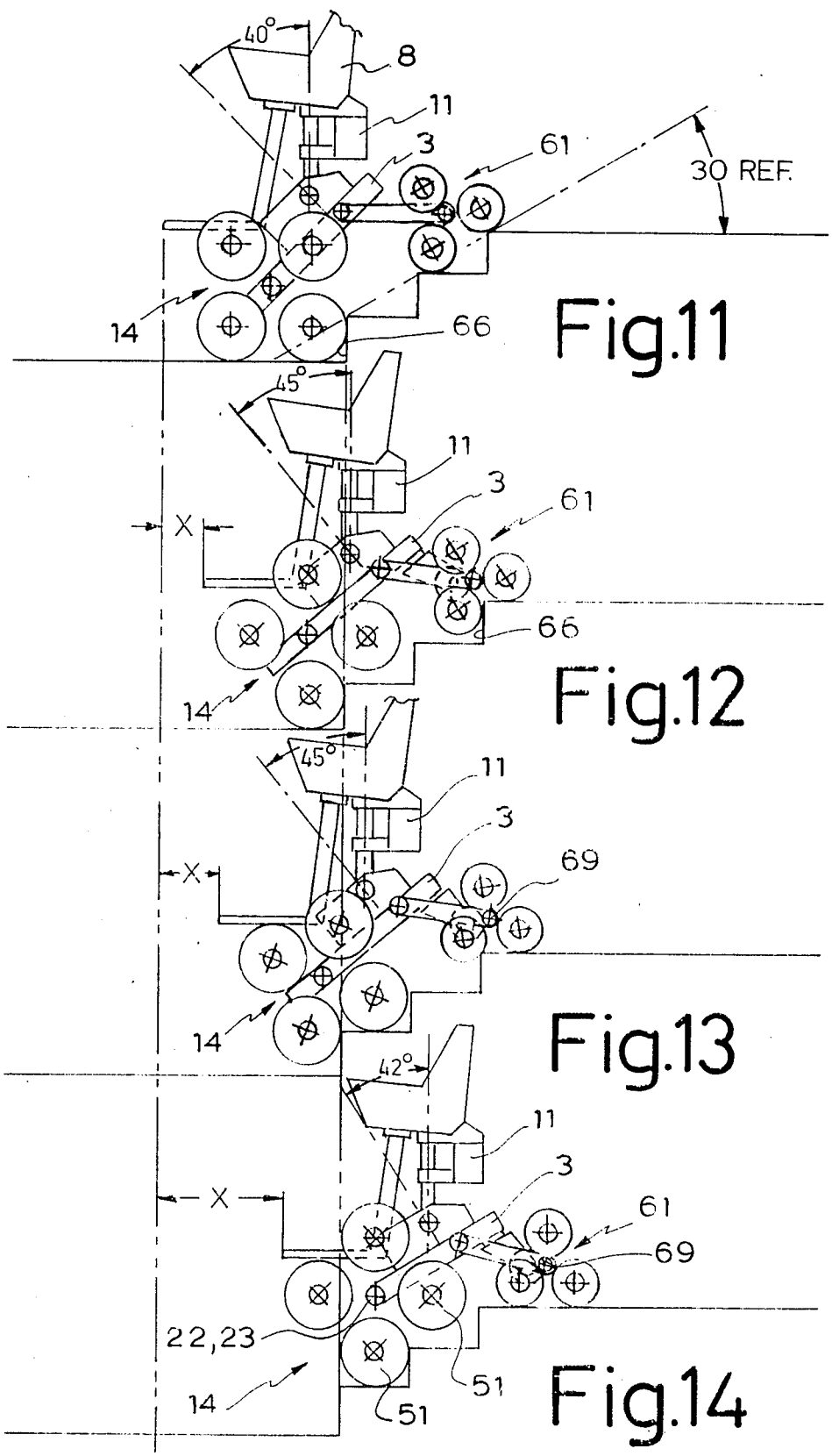

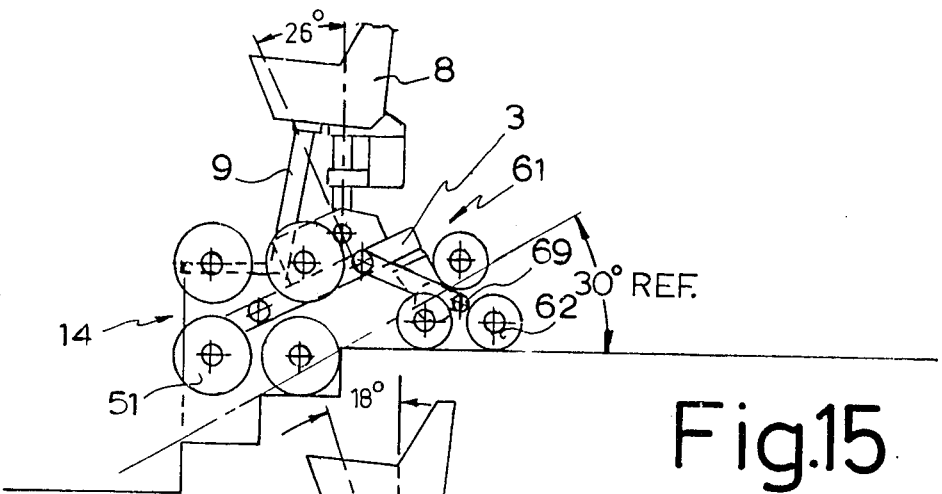
Fig.15
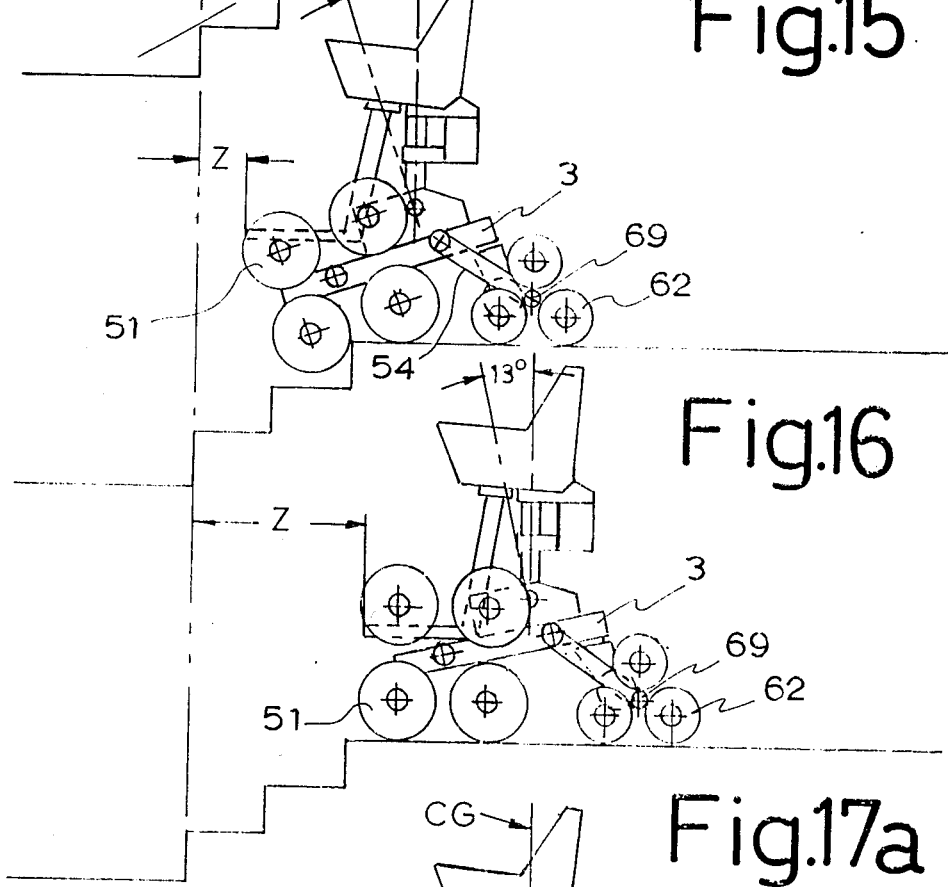
Fig.16
Fig.17a
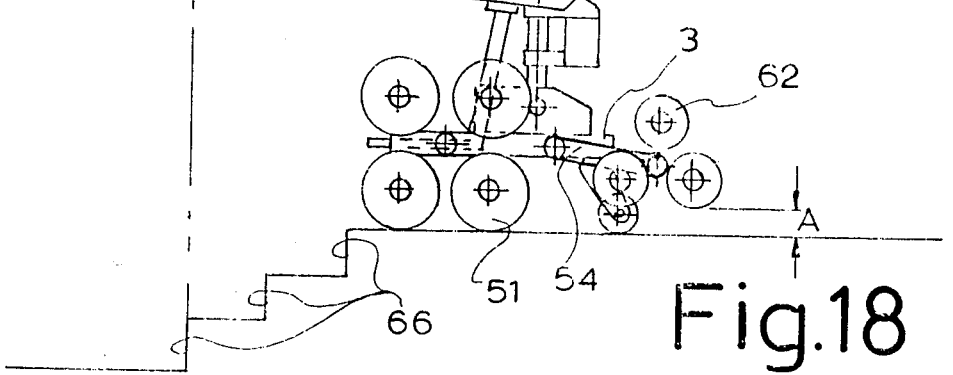
Fig.18

CLIMBING AND DESCENDING VEHICLE

FIELD OF THE INVENTION

The present invention relates to vehicles of the type adapted to surmount impediments, such as stairs, and which are also adapted to travel over level ground.

BACKGROUND OF THE INVENTION

Stair-climbing vehicles having a pair of spiders, each provided with radially-disposed wheels are well known. Some of these spider wheels are free to rotate about their individual axes, or are rotationally driven even while the spiders are operative on a staircase. Both constructions are dangerous, since they may cause the vehicle to roll backwards or tip over when on the staircase. Other types of such vehicles make use of endless belts. Such types of vehicles lack traction and are apt to damage the stair edges. They are also excessively complex in construction.

OBJECTS OF THE INVENTION

In view of the above, it is an important object of the present invention to provide an improved stair-climbing vehicle which is completely safe and smooth, while climbing or descending stairs and which is of simple light-weight design.

It is another object of the present invention to provide a vehicle of the character described, which achieves the above-mentioned object by providing a pair of spiders having wheels which, upon striking an impediment, such as a stair riser, automatically activate the spiders into rotation, and which are held against turning while the spiders are operative.

It is yet another object of the present invention to provide a vehicle of the character described, which may be used as a wheelchair, a freight platform or a robot, by way of examples.

SUMMARY OF THE INVENTION

There is disclosed a stair-climbing and descending vehicle, comprising: a frame and an assembly including a power-driven axle rotatively mounted on said frame, a spider freely rotatable on said axle and forming at least three radial arms, evenly spaced, ground-engaging wheels each rotatably mounted at one extremity of a radial arm, a differential gearing including an input gear fixed to said ale, an output gear freely rotatable on said axle, intermediate pinions meshing with said input and output gears and rotatable on radial stud shafts fixed to said spider, and a direction-reversing transmission means carried by each arm and serving as a driving link between said output gear and the respective wheels, whereby the driving force of said axle is apportioned to said wheels and to said spider to rotate said spider when any of said wheels is prevented from rotating and wherein the wheels rotate in the same direction as the spider. A chair is movably attached to the frame above the latter. Preferably, a power source, such as a battery, is secured to the chair. The chair is pivotally mounted on the frame and first actuation means pivot the chair so as to shift the center of gravity of the vehicle towards the rear, as will be explained below.

The two rear corners of the frame have depending swivel wheels adapted for use on level ground or floors.

In order to help in the ascent or descent of stairs, the vehicle is further provided with a stabilizing means consisting of a pair of laterally-spaced identical free spiders. The free spiders have preferably three rotatably-mounted wheels at the ends of their respective arms. The free spiders are also each rotatably attached to a lengthwise-extending carrying member. The forward ends of the latter are each operatively joined to a second actuation means. Such actuation means is adapted to tilt the frame forwardly, downwardly for a purpose explained below. The free spiders of the stabilizing means are retractable when the vehicle is on level surfaces.

BRIEF DESCRIPTION OF THE DRAWINGS

The above will be more clearly understood by having referral to the preferred embodiment of the invention, illustrated by way of the accompanying drawings, in which:

FIG. 4 is a sectional view taken along lines 4—4 of FIG. 2;

FIG. 5 is another sectional view taken along lines 5—5 of FIG. 3;

FIG. 6 is a side elevation of the vehicle, showing the free spider contacting a stair riser;

FIGS. 7-16 are sequential diagrammatic views showing how the vehicle negotiates a flight of stairs;

FIG. 17, shown on the fourth sheet of drawings, is a sequential side elevation view immediately prior to the view of FIG. 6 showing the vehicle approaching a stair riser; and FIGS. 17a and 18 are sequential diagrammatic views showing how the vehicle returns to level ground traveling mode.

Like reference characters indicate like elements throughout the drawings.

DETAILED DESCRIPTION OF THE PREFERRED EMBODIMENT

Figure 1:
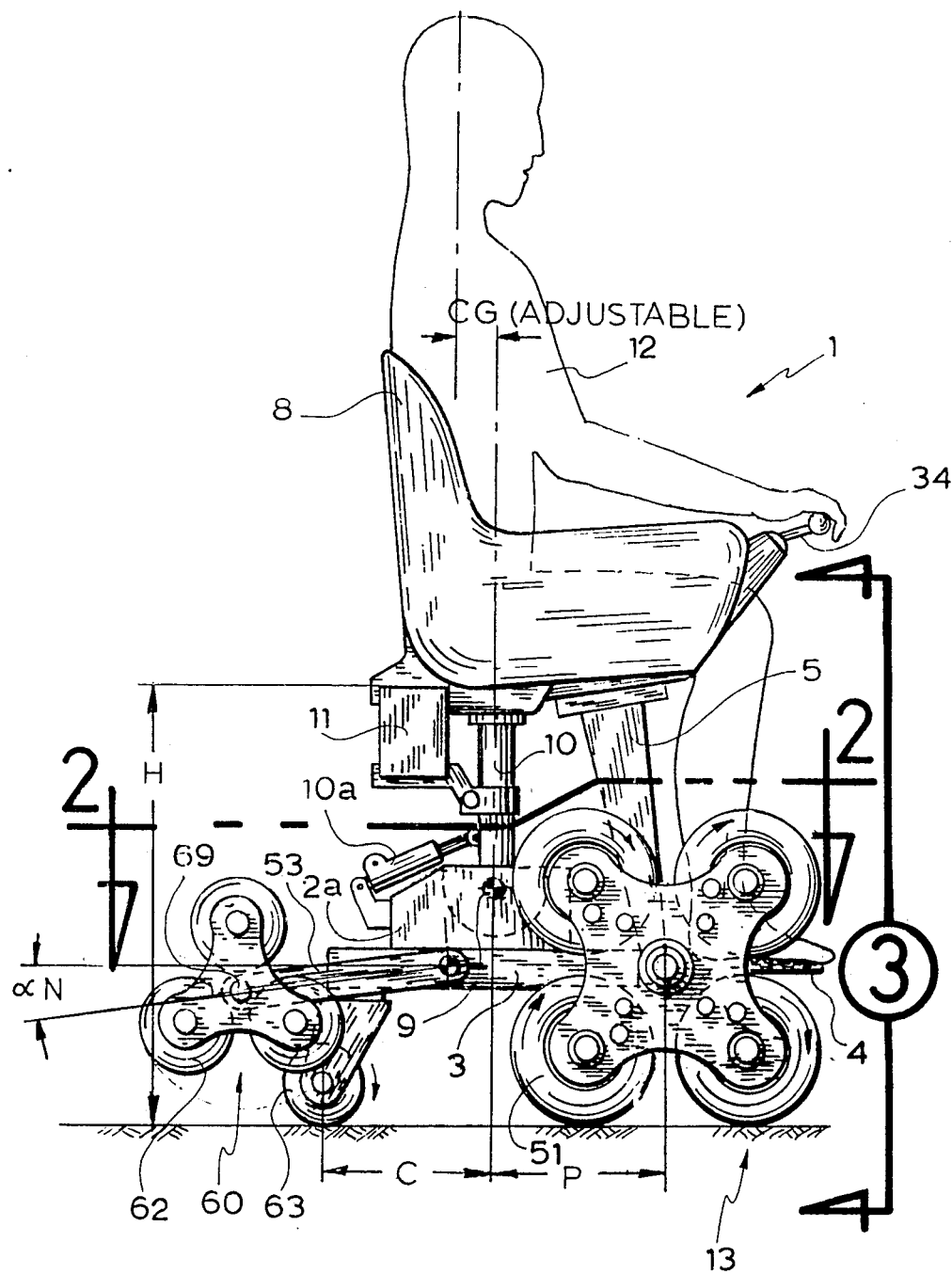
FIG. 1 is a side elevation of a wheelchair according to the invention, also showing a user in the chair.
Figure 2:
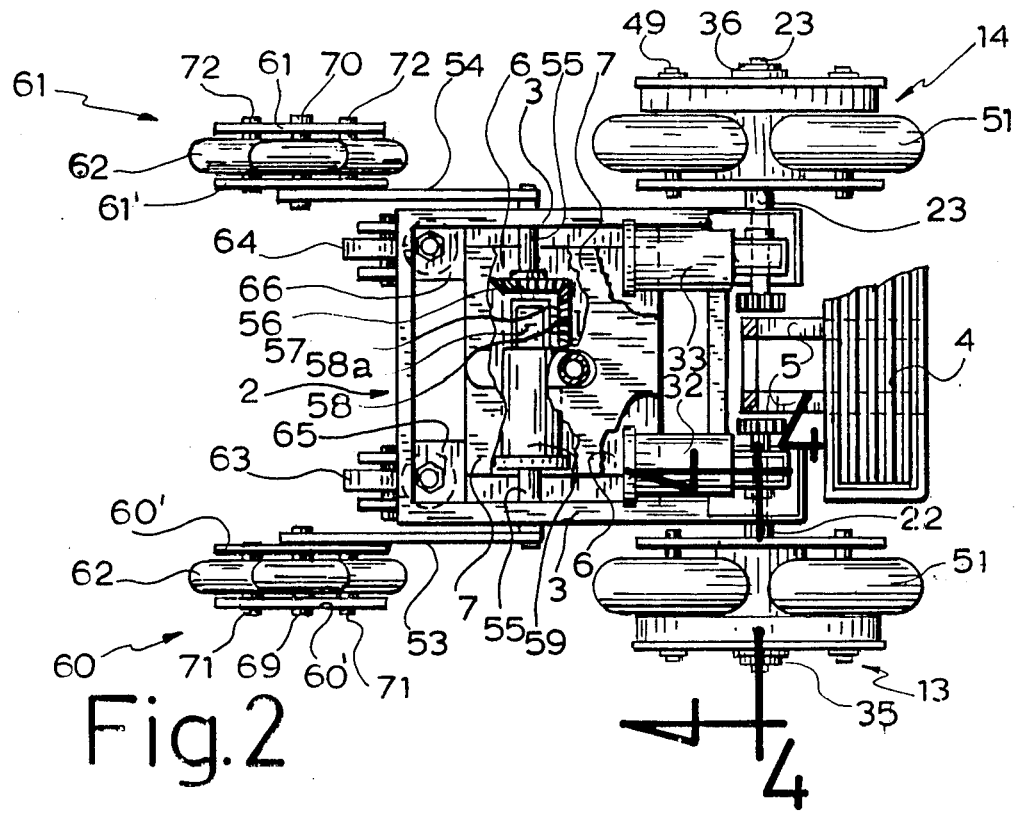
FIG. 2 is a top plan view with parts broken away, taken along lines 2—2 of FIG. 1.

Referring firstly to FIGS. 1 and 2, there is shown a vehicle 1 according to the invention. Vehicle 1 is adapted for use as a wheelchair.

The vehicle has a U-shape rigid frame 2, open at the front and having side beams 3. A foot-rest 4 is provided, supported by L-bars 5 fixed to the underside of a chair 8. Frame 2 further has secured thereto a flat bottom plate 6 and a flat top plate 7.

Chair 8 is movably mounted on frame 2 by means of a post 10 attached to the rear underside of the chair 8 and pivotally secured at its lower end at 9 to upright frame plates 2a of the frame 2. An electrically-operated extensible ram 10a is pivotally connected to post 10 and frame plates 2a to tilt chair 8 backward or forward under the control of a leveling switch, such as a mercury switch (not shown). Thus, the center of gravity (>>CG<< in FIG. 1) of the vehicle and of its occupant can be shifted rearwardly when negotiating a stairway.

A power supply means, such as a battery 11, is secured to chair 8 and supplies the various motors and controls later described.

FIG. 1 further shows an occupant 12 in chair 8.

Figure 3:
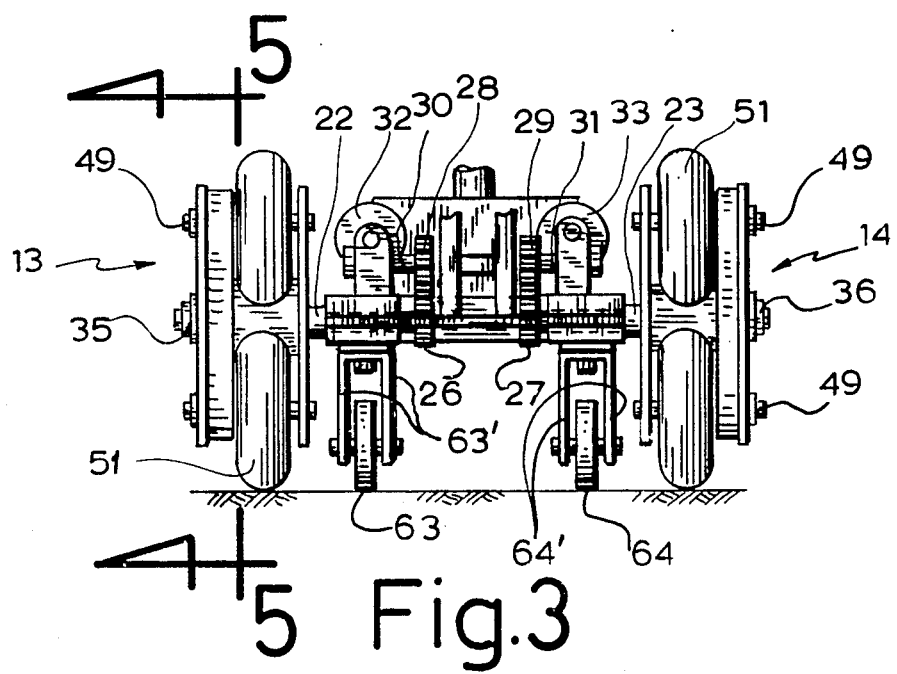
FIG. 3 is a front elevation view, taken along lines 3—3 of FIG. 1.
Figure 7:
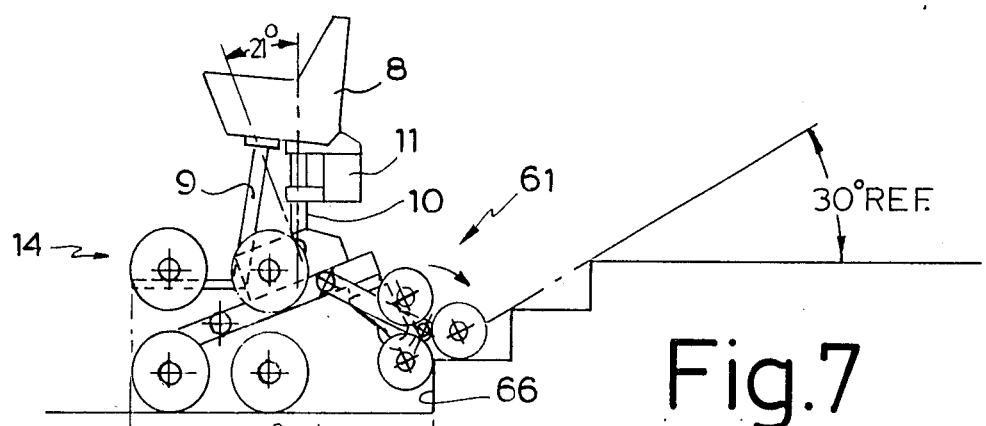
Figure 8:
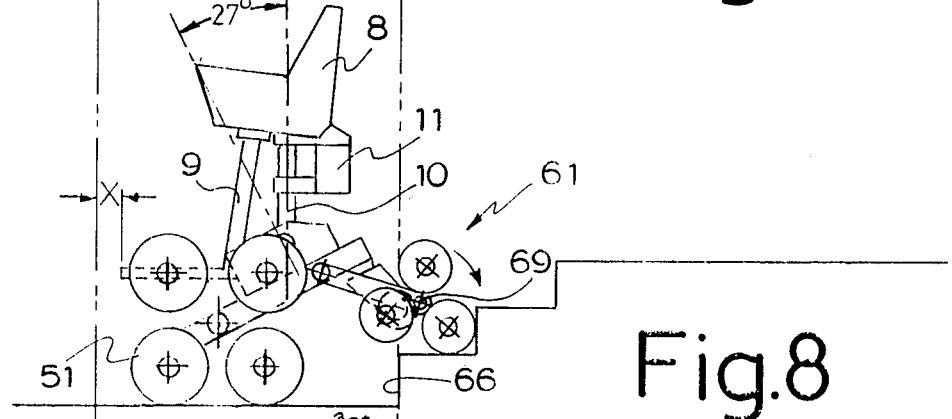
Figure 9:
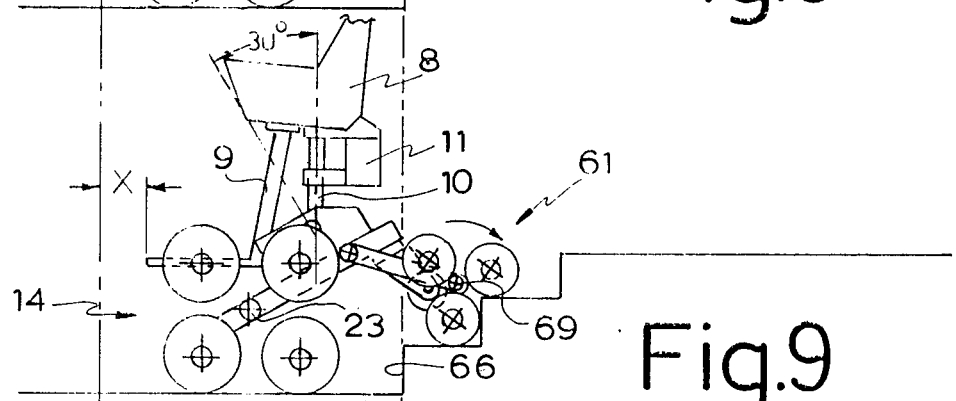
Figure 10:
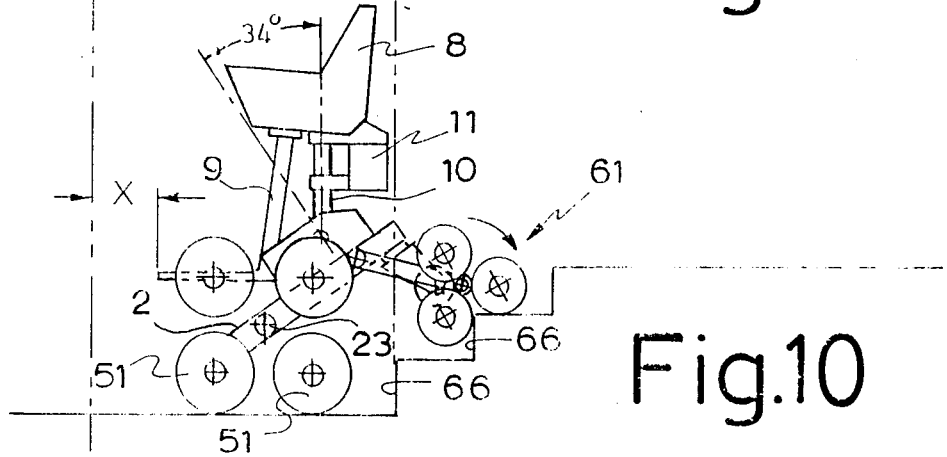

In FIGS. 3 to 5, there are shown a pair of identical spider assemblies designated at 13, 14. Each spider is formed of an inner plate 15 and a parallel outer plate 16, both being of a generally square shape, having concavely-curved sides and convexly curved corners.

Outer plate 16 is provided with generally U-shape orthogonal ribs 18 to define radial arms 17, the inner ends of each two adjacent ribs merging to form arc portions 18'. The latter define a circular central space 19. An internal plate 21, of the same contours as plates 15 and 16, has a central circular opening corresponding to space 19. Plate 21 has bent flange portions 21'. A perimetrical cover 20 is provided to house the transmission means.

Each spider is rotatably, centrally mounted on a respective transverse axle 22, 23. The inner ends of the latter extend through frame 2, one axle on each side, being mounted in the frame by bearings 24, 25 and carrying gears 26, 27 meshes with a drive gear 28, 29, respectively mounted on the output shafts 30, 31 of worm gear reducers 32a, driven by a pair of electric motors 32, 33. Motors , 32, 33 are preferably reversible and one can function independently of the other. To this end, the motors are electrically connected , such as a joystick 34, provided at the front portion of chair 8.

The outer ends of central axles 22, 23 extend through the center of respective spiders 13, 14 and are fitted at their respective outer extremities with a suitable locking cap 35, 36. Spiders 13 and 14 are rotatable on axles 22, 23, respectively.

The space between the transmission means and inner plate 15 is provided with a cylindrical member 37 (see FIG. 4). Member 37 is secured at its inner edge to a disk 38, which is freely mounted on axle 22 by way of sleeve 38'. The outer edge of member 37 is welded, or otherwise rigidly secured, to a flange portion 21' projecting transversely from internal plate 21.

Cylindrical member 37 houses a differential assembly consisting of a driving or input gear 39 solidly fixed to axle 22. Preferably, two and up to four (only two being shown) satellite bevelled pinions 40 mesh with gear 39 and each is rotatably journalled on radial stud shaft 41 fixed to cylinder 37. The cylindrical member 37 further includes a driven or output differential gear 42 freely mounted on axle and meshing with the satellite pinions 40. Output 42 is rigidly secured to a central gear 43, the latter constituting the first element of the transmission means. The differential gears 38, 42 and pinions 40 preferably have equal diameters.

The transmission means for each radial arm 17 consists of a gear train consisting of gear 43, idle gears 44, 45, and a wheel gear 46.

Each twosome of gears 44, 45 are secured to short shafts 47, 48, respectively, the latter being journalled between outer plate 16 and internal plate 21, as clearly shown in FIG. 4. Each of the four wheel gears 46 are secured to a transverse axle 49 on which is solidly mounted a wheel 50 having a rubber tire 51. Wheels 50 are each secured to their respective axles by a key 52 and, moreover, the gears 46 are themselves fixedly secured to their respective wheels 50.

Referring now to FIGS. 1 and 2, there is depicted a stabilizing means for the vehicle. This means consists of a pair of rigid carrying members 53, 54, one on each side of the frame. Members 53, 54 are secured to a transverse shaft 55 at the rear portion of the frame. Shaft 55 is provided with a bevel gear 56, which meshes with another bevel gear 57, the latter being mounted on the output shaft 58 of a speed reducer 58a driven by an electric motor 59.

Rotatably mounted on rear stub axle 69, 70, at the rear end of each carrying member 53, 54, are two free spiders 60, 61. Spiders 60, 61 have three radial arms, each having small wheels 62, respectively mounted between pairs of plates 60', 61', on stub shafts 71, 72, respectively.

The vehicle unit is completed by a pair of swivel wheels 63, 64, pivotally secured to the two rear corners of the frame by way of plates 65, 66, respectively, and flanges 63', 64' respectively.

FIG. 1 illustrates the wheelchair vehicle in level ground travelling mode: the stabilizing means is retracted upwardly, so that a short wheelbase between the swivel wheels 63, 64 and the spider wheels 51 is defined to maximize the handling and turning capability of the vehicle. The vehicle can travel forwardly or rearwardly and can be steered by selectively controlling the speeds of motors 32, 33 by joystick 34.

As seen in FIG. 4, the spider assembly 13 has torque delivered to the differential means through axle 22 by motor 32. As long as lower wheels 51 are free to rotate and to travel over unobstructed ground, the spider does not rotate and input gear 39 rotates output gear 42 through satellite pinions 40, the stud shafts 41 of which do not central gear 43, which in turn powers wheels 51 through the transmission means.

When a front wheel 51 of the wheelchair strikes an impediment, such as a stair riser 66 (see FIG. 11), the wheel is locked against the riser and ceases to turn; consequently, the entire transmission means ceases to turn, including central gear 43, and hence output gear 42. Since the torque supplied by the motor remains constant, such locking of gear 42 will cause the stud shafts 41 of satellite pinions 40 to begin revolving in a plane perpendicular to the axis of axle 22, since the pinions continue to rotate about their individual axes. Thus, cylindrical member 37 begins to turn in the same direction as that of wheels 51 when they were rotating. The spider is thereby rotated about its axle 22. The other spider, of course, is actuated in the same way.

Referring now to FIGS. 6-18, there is shown the wheelchair vehicle 1 ascending a staircase typically inclined at a thirty degree angle. The vehicle 1 does so backwardly, by reversing motors 32, 33.

FIGS. 17 shows the wheelchair approaching a riser 66 just prior to the rearmost wheel 62 of free spider 61 contacting the riser. The occupant then actuates the motor 59 by a button 68 disposed adjacent the joystick 34. Motor 59 lowers the two free spiders 60, 61 from the non-use position of FIG. 1 to engage the floor. Upon further actuation of the motor 59 the frame will be raised to tilt upwardly rearwardly. As such tilting is effected the mercury switch is actuated to maintain the chair 8 level as the latter moves rearwardly. FIG. 6 shows the next sequential step as a small wheel 62 surmounts the riser 66 of the stair and the frame increases its angle of tilt $a''$ relative to a horizontal plane.

It will be readily appreciated from FIGS. 6 to 18 that such tilting of the frame and movement of chair 8 shifts the center of gravity of the entire vehicle rearwardly by a predetermined distance. Thus from FIGS. 7 to 12 the angle of tilt is gradually increasing while from FIGS. 13 to 17a the angle decreases as the vehicle attains the top of the stairs. Shifting the center of gravity is important to the proper functioning of the wheelchair. In FIG. 18 the stair ascent is complete and the free spiders 60, 61 are retracted once again for unobstructed travel mode, and the center of gravity has shifted back to a point slightly behind the two front spiders.

In order to descend a stair case the reverse procedure is followed with the motorized spiders first. It is to be noted that during such a descent wheels 51 of the spiders 13, 14 cannot rotate at a greater speed than as controlled by motors 32, 33 because of worm gear reducers 32a. If the stairway is not steep, as shown, the spiders will simply oscillate while their wheels negotiate the steps. If the stairway is steep enough so that the axles 22, 23 are ahead of the axis of the lowermost wheels 51 as they come to rest on the next lower step, the resultant force of the load will firmly keep these lowermost wheels 51 against the step riser 66 while the spiders rotate in the descending direction. In both cases, a smooth, stable and completely safe descent of the vehicle is obtained.

It is also to be noted that the differential assemblies rotate the spiders at no more than one-half the speed of the wheels 51, thereby ensuring that the motors 32, 33 will not be overloaded and that stair climbing is effected at a safe speed.

One or two of the motorized spider wheel assemblies of the invention can replace the wheels of a one wheel handbarrow or of a two-wheel hand truck for transporting loads up and down stairways.

For certain applications, the two separate axles 22, 23 can be replaced by a single driving axle powered by a single motor.

What we claim is:

1. A stair climbing and descending vehicle comprising: a frame;
a pair of co-axial axles, each independently and each rotatively mounted on said frame transversely of said vehicle;
a spider freely rotatable on each axle and forming at least three radial arms; the two spiders disposed on opposite sides of said vehicle;
evenly-spaced ground-engaging wheels, each rotatably mounted at one extremity of a radial arm;
a differential gearing including an input gear fixed to each axle;
an output gear freely rotatable on each axle
intermediate pinions meshing with said input and output gears and rotatable on radial stud shafts fixed to said spider;
a direction-reversing transmission means carried by each radial arm and serving as a driving link between said output gear and the respective wheels, whereby the driving force of each axle is apportioned to said wheels and to said spider to rotate said spider when any of said wheels is prevented from rotating, and wherein the wheels rotate in the same direction as the spider;
each said spider comprising an inner plate, a parallel outer plate and an internal plate between said inner and said outer plates; said internal plate having a central circular opening; said differential gearing being located between said inner plate and said internal plate, and said transmission means being located between said internal plate and said outer plate.

2. A stair climbing and descending vehicle as defined in claim 1, wherein said spider further includes a cylindrical member surrounding said differential gearing and to which said stud shafts are fixed.

* * * * *